United States Patent
Wotton et al.

(10) Patent No.: US 10,562,579 B2
(45) Date of Patent: Feb. 18, 2020

(54) PRESSURE COMPENSATOR FOR METER HOUSING

(71) Applicant: Polaris Industries Inc., Medina, MN (US)

(72) Inventors: Geoffrey Wotton, Battle Ground, WA (US); Mark Andrew Powell, Camas, WA (US); Benjamin Travis Chambers, Battle Ground, WA (US); Justin Larson, La Center, WA (US)

(73) Assignee: Polaris Industries Inc., Medina, MN (US)

( * ) Notice: Subject to any disclaimer, the term of this patent is extended or adjusted under 35 U.S.C. 154(b) by 157 days.

(21) Appl. No.: 15/471,967

(22) Filed: Mar. 28, 2017

(65) Prior Publication Data

US 2017/0199061 A1    Jul. 13, 2017

Related U.S. Application Data

(63) Continuation-in-part of application No. 14/937,946, filed on Nov. 11, 2015, now Pat. No. 10,175,068.

(Continued)

(51) Int. Cl.
*B62J 99/00*    (2009.01)

(52) U.S. Cl.
CPC .......... *B62J 99/00* (2013.01); *B62J 2099/002* (2013.01)

(58) Field of Classification Search
CPC ........ G01D 11/24; G01D 11/245; G01D 1/02; G01D 1/023; B62J 99/00; H05K 5/0213; B60K 37/02; B60K 35/00
See application file for complete search history.

(56) References Cited

U.S. PATENT DOCUMENTS

| | | |
|---|---|---|
| 3,677,248 A | 7/1972 | McPhee |
| 3,896,849 A | 7/1975 | Ervin et al. |

(Continued)

FOREIGN PATENT DOCUMENTS

| | | |
|---|---|---|
| CN | 101102959 | 1/2008 |
| DE | 8914781 | 2/1990 |

(Continued)

OTHER PUBLICATIONS

International Search Report and Written Opinion issued by the International Searching Authority, dated Oct. 4, 2016 for corresponding International Application No. PCT/US2016/041721, 11 pages.

(Continued)

*Primary Examiner* — Andrew T Kirsch
(74) *Attorney, Agent, or Firm* — Faegre Baker Daniels LLP

(57) ABSTRACT

A seal for a meter housing with an interior portion is disclosed. The seal includes an axially inner surface configured to face the interior portion of the meter housing and an axially outer surface configured to face away from the interior portion of the meter housing. At least one of the axially inner surface and the axially outer surface is configured to seal against a portion of the housing. The seal further includes a diaphragm defined axially intermediate the axially inner surface and the axially outer surface and a fluid passageway defined through a portion of the diaphragm. The fluid passageway is configured to move between an open position and a closed position in response to a pressure differential between the interior portion of the housing and an exterior portion.

20 Claims, 14 Drawing Sheets

Related U.S. Application Data

(60) Provisional application No. 62/190,433, filed on Jul. 9, 2015.

(56) References Cited

U.S. PATENT DOCUMENTS

| | | | |
|---|---|---|---|
| 5,522,769 A * | 6/1996 | DeGuiseppi | F16H 57/027 454/270 |
| 6,533,254 B1 | 3/2003 | Grifka | |
| 6,951,295 B1 | 10/2005 | Gaus et al. | |
| 7,101,640 B1 * | 9/2006 | Kump | H01M 2/1205 29/623.1 |
| 8,419,830 B2 | 4/2013 | Masetto et al. | |
| 8,430,442 B2 | 4/2013 | Utke et al. | |
| 8,543,306 B2 | 9/2013 | Utke et al. | |
| 8,930,109 B2 | 1/2015 | Utke et al. | |
| 9,080,514 B2 | 7/2015 | Utke et al. | |
| 2009/0029641 A1 | 1/2009 | Furuuchi | |
| 2010/0076366 A1 | 3/2010 | Henderson, Sr. et al. | |
| 2017/0010134 A1 | 1/2017 | Chambers | |

FOREIGN PATENT DOCUMENTS

| | | |
|---|---|---|
| JP | H09263232 | 10/1997 |
| JP | 2000208948 A | 7/2000 |

OTHER PUBLICATIONS

International Search Report issued by the International Searching Authority, dated Jun. 27, 2018, regarding International Patent Application No. PCT/US2018/024830; 9 pages.

Written Opinion of the International Searching Authority, dated Jun. 27, 2018, regarding International Patent Application No. PCT/US2018/024830; 7 pages.

International Preliminary Report on Patentability issued by the European Patent Office, dated Jul. 12, 2019, for International Patent Application No. PCT/US2018/024830; 15 pages.

Office Action issued by the Canadian Intellectual Property Office, dated Jan. 14, 2019, for Canadian Patent Application No. 2,991,621; 3 pages.

* cited by examiner

PRESSURE COMPENSATOR FOR METER HOUSING

CROSS-REFERENCE TO RELATED APPLICATIONS

The present application is a continuation-in-part of U.S. patent application Ser. No. 14/937,946, filed on Nov. 11, 2015, and titled "PRESSURE COMPENSATOR FOR METER HOUSING," which claims priority to U.S. Provisional Patent Application Ser. No. 62/190,433, filed on Jul. 9, 2015, and titled "PRESSURE COMPENSATOR FOR METER HOUSING," the complete disclosures of which are expressly incorporated by reference herein.

FIELD OF THE INVENTION

This invention relates to a way of compensating for pressure changes that affect a sealed compartment, such as the interior of a motorcycle meter or the like.

BACKGROUND AND SUMMARY OF THE INVENTION

Meters used on motorcycles include digital displays of, for example, running time, engine temperature and other information. Since the motorcycles may be of the trail-type for traversing rough terrain, the meters must be robust to withstand vibration and shock. The meters must also be well sealed to prevent penetration of fine dust and moisture into the meter. For convenience, the interior of the meter housing that includes the electronic and other components and that is intended to be protected from penetration of dust and moisture will be referred to as the meter compartment, or simply "compartment."

In the past, the technique for sealing the meter compartment included a small, passive vent that enabled filtered air to pass into and out of compartment. Thus, the pathway between the compartment and ambient air is continuously open, and the filter is relied upon for preventing penetration of fine particles. The continuously open air pathway compensates for changes in ambient pressure by permitting air flow between the compartment to equalize pressure inside and outside of the meter. In such a design, it is important that the vent also prevents the passage of moisture into the compartment while allowing the pressure-equalizing air flow. To this end, porous hydrophobic material is often selected for use as vent's filter, which spans an opening or passage into the compartment. Such material is not, however, completely effective, and over time the continuously open venting approach will enable moisture to accumulate within the meter compartment, which leads to corrosion and other problems, including fogging of the meter display when the moisture condenses on it.

One prior solution to the forgoing problem is to place a package of desiccant material within the compartment, but this merely delays the problem for as long as it takes for the desiccant to saturate.

Completely sealing the compartment (that is, eliminating the continuously open vent) is not a practical option because large changes in ambient pressure, such as pressure drops occurring when meters are shipped by air or otherwise transported to high-elevations, can lead to failure of the compartment water seals and/or distortion of the display and other components.

The present invention is directed to a solution to the forgoing problem and provides, among other things, a way of compensating for the pressure changes affecting sealed compartments by eliminating the prior art, continuously open pathway between ambient air and the compartment interior, while occasionally and briefly opening the pathway to prevent damage from extreme pressure differences.

In one illustrative embodiment of the present disclosure, a seal for a housing with an interior portion is disclosed. The seal comprises an axially inner surface configured to face the interior portion of the meter housing and an axially outer surface configured to face away from the interior portion of the meter housing. At least one of the axially inner surface and the axially outer surface is configured to seal against an outer cover of the meter housing. The seal further comprises a diaphragm defined axially intermediate the axially inner surface and the axially outer surface and a fluid passageway defined through a portion of the diaphragm. The fluid passageway is configured to move between an open position and a closed position in response to a pressure differential between the interior portion of the housing and an exterior portion.

In a further illustrative embodiment of the present disclosure, meter housing comprises a plurality of walls generally enclosing an interior portion of the housing and a seal positioned at one of the plurality of walls. The seal comprises an axially inner surface facing the interior portion of the housing and an axially outer surface facing a portion of the housing. At least one of the axially inner surface and the axially outer surface is configured to seal against the portion of the housing to sealingly enclose the interior portion of the housing. The seal further comprises a diaphragm defined intermediate the axially inner surface and the axially outer surface. The diaphragm has a fluid passage configured to open in response to a pressure differential between a pressure in the interior portion of the housing and a pressure exterior of the housing.

In another illustrative embodiment of the present disclosure, a housing comprises a plurality of walls generally enclosing an interior portion of the housing, an outer cover configured to be positioned adjacent an opening in one of the plurality of walls, an electrical component supported within the interior portion of the housing, and a seal positioned at the opening in the one of the plurality of walls. The seal comprises an axially inner surface facing the electrical component supported within the housing and an axially outer surface facing the outer cover of the housing. At least one of the axially inner surface and the axially outer surface is configured to seal against the housing. The seal further comprises a diaphragm defined intermediate the axially inner surface and the axially outer surface. The diaphragm has a fluid passage configured to open in response to a pressure differential between a pressure in the interior portion of the housing and a pressure exterior of the housing.

Other advantages and features of the present invention will become clear upon study of the following portion of this specification and drawings.

DETAILED DESCRIPTION

Figure 1:
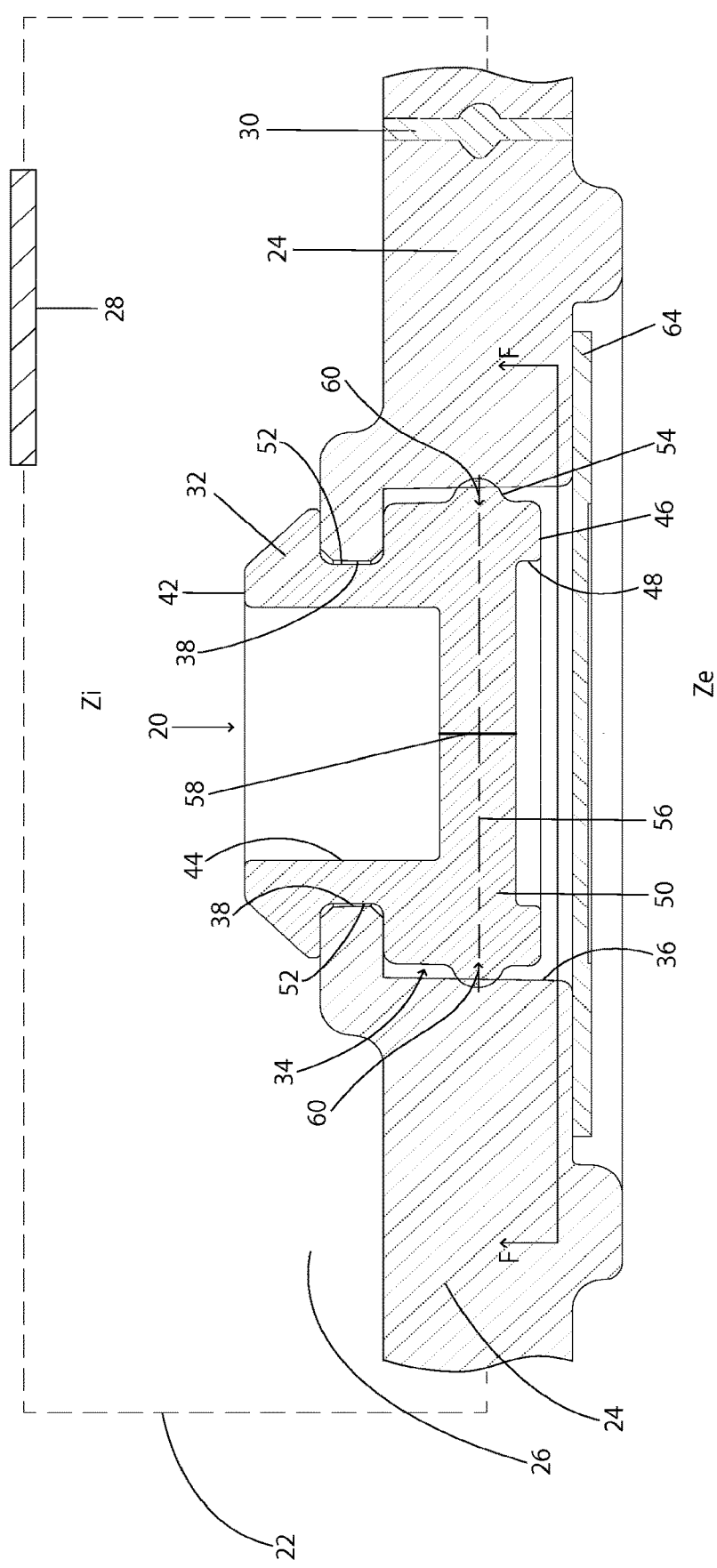
FIG. 1 is a diagram of a meter, including a cross section view of a portion of the meter that includes a preferred embodiment of a pressure compensator apparatus of the present invention.
Figure 2:
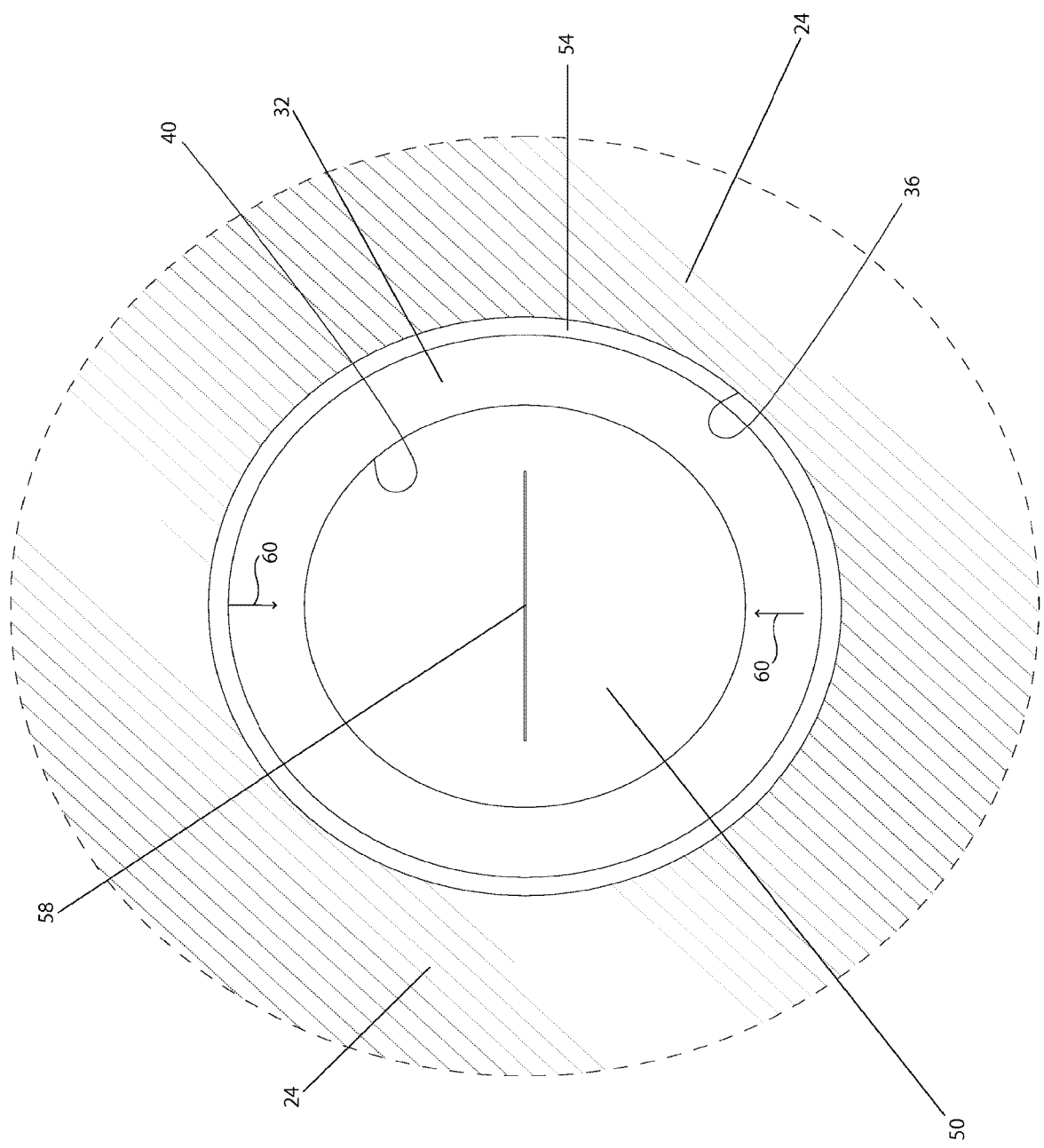
FIG. 2 is a section view, taken along line F-F of FIG. 1.
Figure 3:
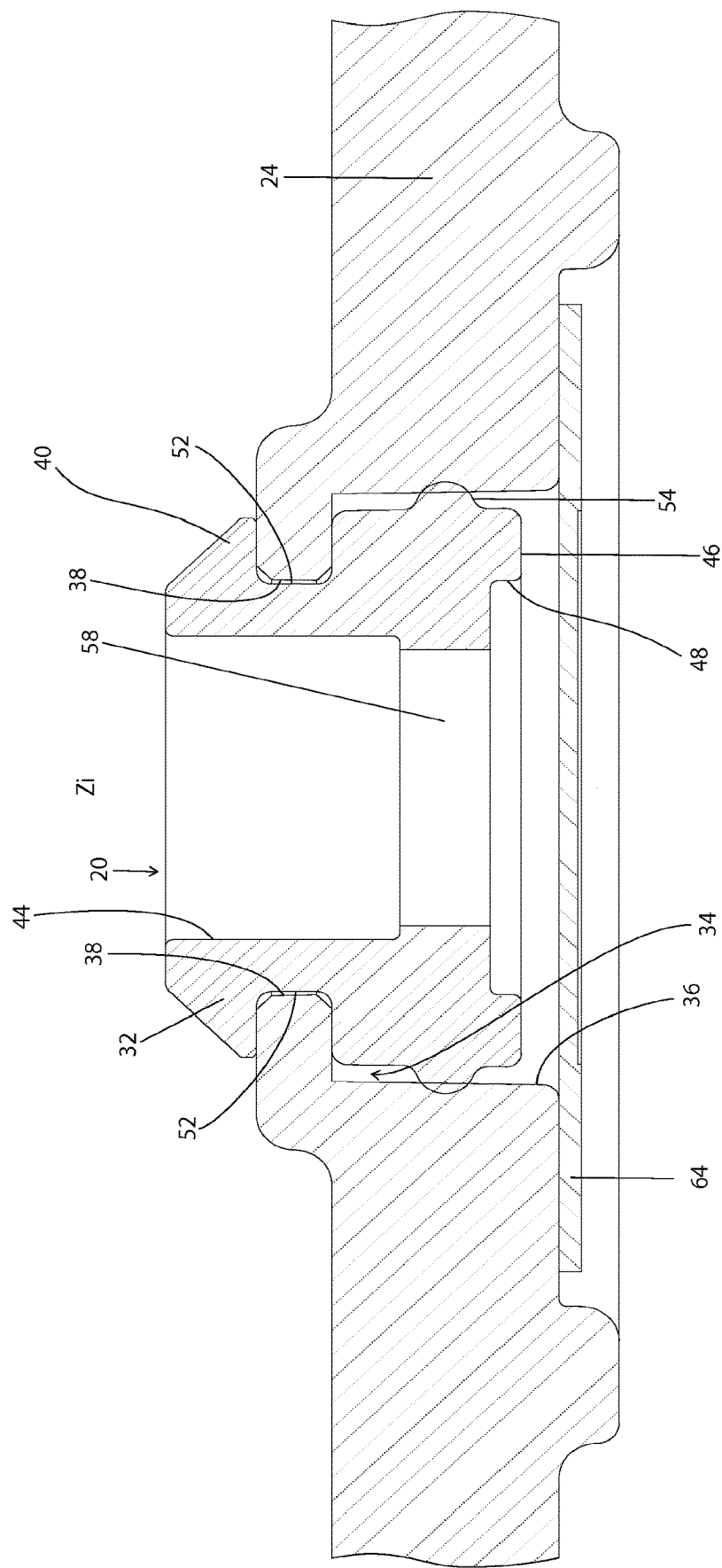
FIG. 3 is a cross section view, like FIG. 1 but rotated by 90 degrees about a horizontal centerline.

FIGS. 1-4 show a preferred embodiment of a pressure compensator apparatus 20 formed in accordance with the present invention. In this embodiment, the apparatus 20 is incorporated into the housing of a meter that is used on a motorcycle and that includes a digital displays of, for example, running time, engine temperature and other information. Since the motorcycle may be of the trail-type for traversing rough terrain, the meter must be robust to withstand vibration and shock. The meter must also be well sealed to prevent penetration of fine dust and moisture into the meter. The apparatus may be incorporated into any of a variety of housings, including those that house light sources for headlights etc.

The figures depict a portion of the meter that includes a housing that generally comprises a housing wall 24 inside of which forms a compartment 26 that encloses the meter electronic components (not shown). The housing also includes a transparent part that serves as a window 28 for the meter display. One can consider the compartment as having an interior zone "Zi" that is sealed from the space surrounding it, which surrounding space can be considered as an exterior zone "Ze" which in most cases would be ambient air. The housing 22 is assembled from pieces that are joined and sealed (an exemplary wall seal being depicted at 30 in FIG. 1) to keep the interior zone Zi separate and sealed from the exterior zone Ze.

The pressure compensating apparatus 20 of the current invention is part of or attached to the housing 22 for compensating for the pressure changes affecting the sealed compartment 26 without the presence of a continuously open pathway between the interior zone Zi and exterior zone Ze. As will become clear, the apparatus 20 includes a seal 32 for normally closing an opening 34 in the housing between the interior zone Zi and exterior zone Ze. In one embodiment, the opening 34 includes a counterbored hole in the housing wall 24 that forms a counterbored portion 36 of the opening that is adjacent to a relatively smaller diameter portion of the opening that is formed by a radially inwardly protruding annulus 38. The seal 32 is formed of flexible material, such as silicone rubber and seats in the opening 34, primarily by engaging the annulus 38.

The seal 32 is somewhat cup-shaped, having a generally cylindrical sidewall 40, and an inner side 42 that is open to a central aperture 44 in the seal. The outer side 46 of the seal 32 includes a shallow, round outer recess 48 formed therein, and between that recess 48 and the aperture 44 there is formed a flexible diaphragm 50 that is configured to bow or flex inwardly and outwardly in response to pressure differences between the interior zone Zi and exterior zone Ze, as will be discussed more below.

The seal 32 engages the annulus 38 via a peripheral groove 52 formed in the seal sidewall 40 and sized to snugly engage the annulus (FIG. 1). When so engaged, the seal sidewall 40 of this embodiment extends outwardly (from the interior zone Zi) to protrude into the counterbored portion 36 of the opening 34. Here the seal sidewall 40 includes a peripheral, radially protruding rib 54 that can be, for example, semi-circular in cross section. The rib 54 surrounds an imaginary central plane 56 (FIG. 1, dashed lines) of the diaphragm when the diaphragm is in a normal or relaxed orientation, as would occur when there is no significant difference in pressure between the interior zone Zi and exterior zone Ze. The outside diameter of the rib 54 is slightly larger than the diameter of the counterbored portion 36 of the opening 34 and, therefore, the portion of the seal 32, including diaphragm 50 is slightly compressed when the seal is installed as shown in FIG. 1.

The diaphragm 50 is provided with a very thin, central linear slit 58 extending through it. The slit 58 is preferably made prior to installation of the seal, and once in place, the slight compressive force attributable to the compressed rib portion of the seal and that acts across the width of the slit 58 (that force illustrated with arrows 60 in FIG. 2) urges the slit closed. Alternatively, the slit 58 may be made after the seal 32 is installed.

Whenever there develops a pressure difference between the interior zone Zi and exterior zone Ze, as might occur, for example, when the meter is transported to a relatively high-altitude location, the diaphragm 50 is able to flex or bow out of its normal, equal pressure or relaxed orientation (FIG. 1). A drop in the pressure of exterior zone Ze will cause the diaphragm to bow outwardly, which changes (here, increasing) the volume of the interior zone Zi, which has the effect of reducing the pressure in that zone to thereby compensate slightly for the pressure drop occurring in the exterior zone Ze.

Figure 4:
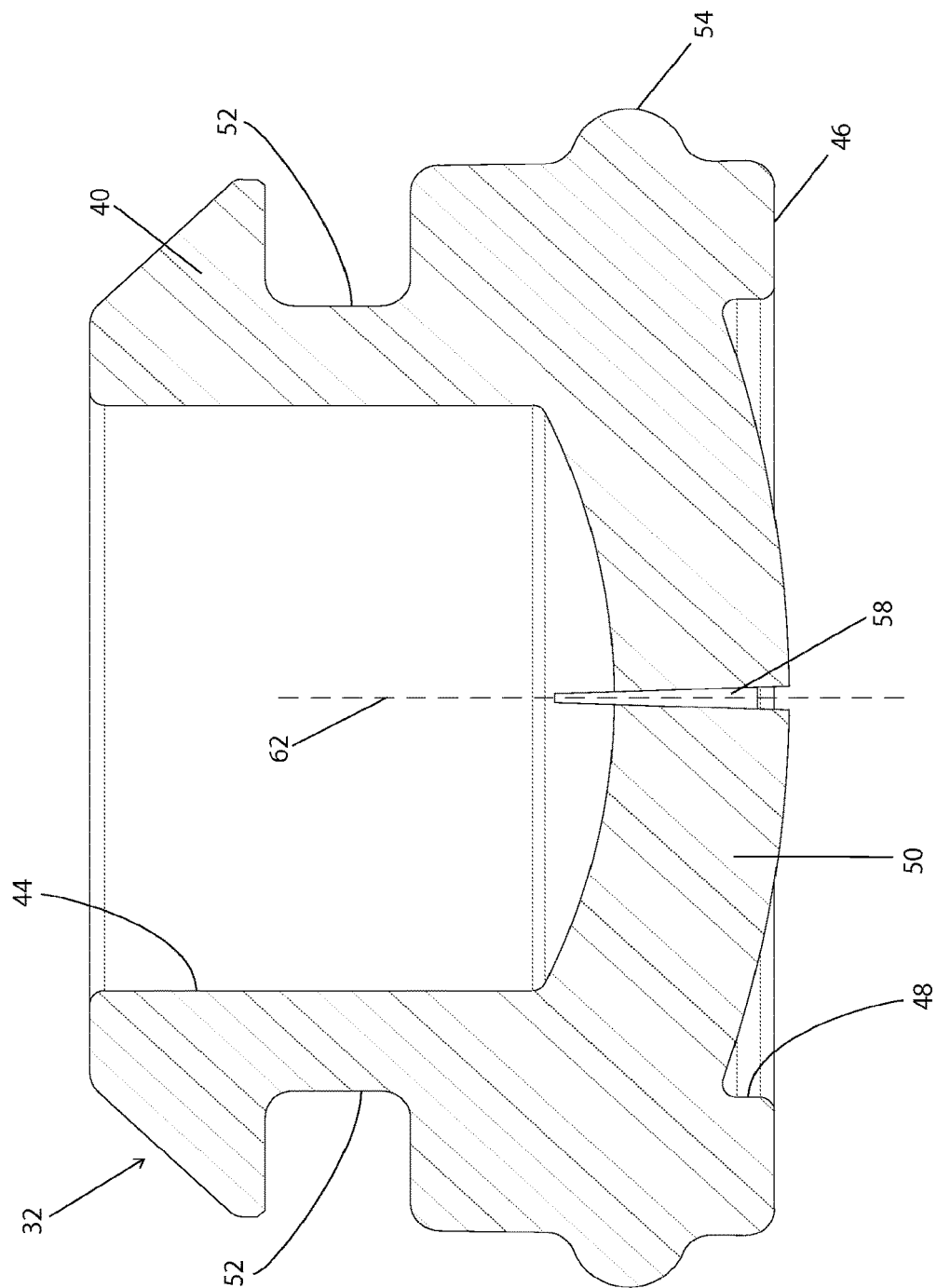
FIG. 4 is an enlarged cross section view of the seal component of the pressure compensator apparatus of FIG. 1, showing operation of a diaphragm component of the seal.

In instances where the pressure difference or differential between the interior zone Zi and exterior zone Ze becomes extreme, the diaphragm will bow out (or in, should the exterior zone pressure be greater than the interior zone pressure) by an amount that is sufficient to cause the slit 58 to open slightly as illustrated in FIG. 4. Such extreme pressure differentials may occur, for example, when the meter is shipped via air transport. It will be appreciated that during the brief time that the slit 58 is open, there is provided an open pathway 62 for air to move from the higher pressure zone Zi to the lower pressure zone Ze, thereby reducing the pressure differential between the two zones. The differential will reduce until the resilience of the diaphragm overcomes the remaining pressure differential and closes the slit 58. That is, the resilience of the diaphragm will urge the diaphragm back toward the normal position (FIG. 1) for closing the slit 58.

When the slit briefly opens as just described, there is an opportunity for moisture to enter the compartment. Preferably, the pressure compensator 20 is supplemented with a porous hydrophobic filter 64 that is attached to the housing wall 24 adjacent to the outer side 46 of the seal 32 to cover the opening as shown in FIG. 1, for example. Alternatively, the filter 64 could be attached adjacent to the inner side 42 of the seal, although the outer side attachment is preferred for the purpose of preventing debris from contacting the seal.

The filter prevents moisture and fine particles from moving into the compartment during the brief time that the pathway 62 is open. In this regard, it is contemplated that the filter 64 is optional since most pressure differences between the interior zone Zi and exterior zone Ze will not be so extreme as to cause the slit to open, the opening may be covered with filter material that is not necessarily hydrophobic. Moreover, a desiccant may be in place within the compartment since the infrequent opening of the slit 58 will provide a very long service life for the supply of the moisture-absorbing desiccant.

Figure 5:
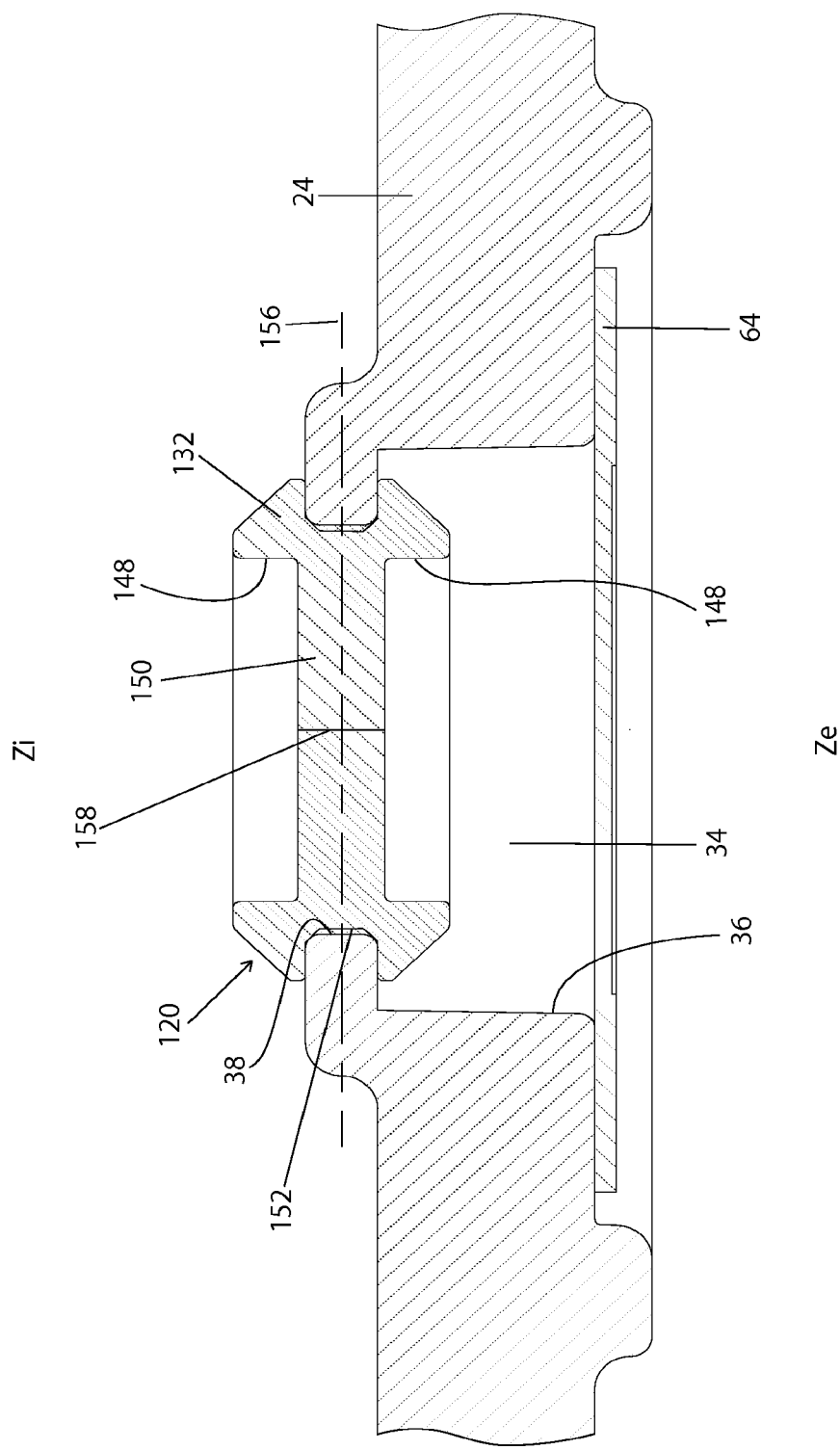
FIG. 5 is a diagram like FIG. 1 but showing an alternative embodiment of the present invention.

FIG. 5 depicts an alternative embodiment 120 of the pressure compensating apparatus. In this embodiment, the seal 132 is smaller than that of the previously described embodiment in that it does not extend into and engage the counterbored portion 36 of the opening 34. Rather, the seal 132 is generally a wheel or disc shaped in cross section (FIG. 5), and symmetrical about the central plane 156 of the diaphragm 150. The seal 132 includes two circular recesses 148 on each side of the diaphragm 150, as well as a peripheral groove 152 that, like the prior-described groove 52, is sized to compressively engage the annulus 38 when the seal is installed. It is noteworthy here that this embodiment 120 can be installed in a simple hole. That is, a hole with no counterbore or other complex features.

The seal of this embodiment also includes a very thin, central linear slit 158 extending through the diaphragm 150. The slit 158 is made prior to or after installation of the seal. Since the diaphragm is centered on the annulus 38 in this embodiment, the compression developed from the annulus and seal engagement applies a slight compressive force that acts across the width of the slit 158 to urge the slit closed.

The pressure compensating operation of this embodiment of the pressure compensator apparatus 120 (flexing diaphragm, slit briefly opening at extreme pressure differentials) matches what was described above in connection with the earlier embodiment, and will not be repeated here.

FIGS. 6-12 disclose an alternative embodiment pressure compensating apparatus 220 of the present disclosure. Alternative pressure compensating apparatus 220 is configured to couple with a meter or electrical housing or compartment 222 for supporting various electrical components therein. For example, meter housing 222 may be supported on a vehicle (not shown) and is configured to support electrical components, such as a battery 226 for a meter (not shown) on housing 222. Pressure compensating apparatus 220 is configured couple with any of a plurality of walls 223 (FIG. 10) of housing 222 to inhibit dust and moisture from entering housing 222 and also is generally configured to allow any fluid within housing 222 to flow outwardly from housing 222 to prevent rust formation or other damage to the electrical components supported therein.

Figure 6:
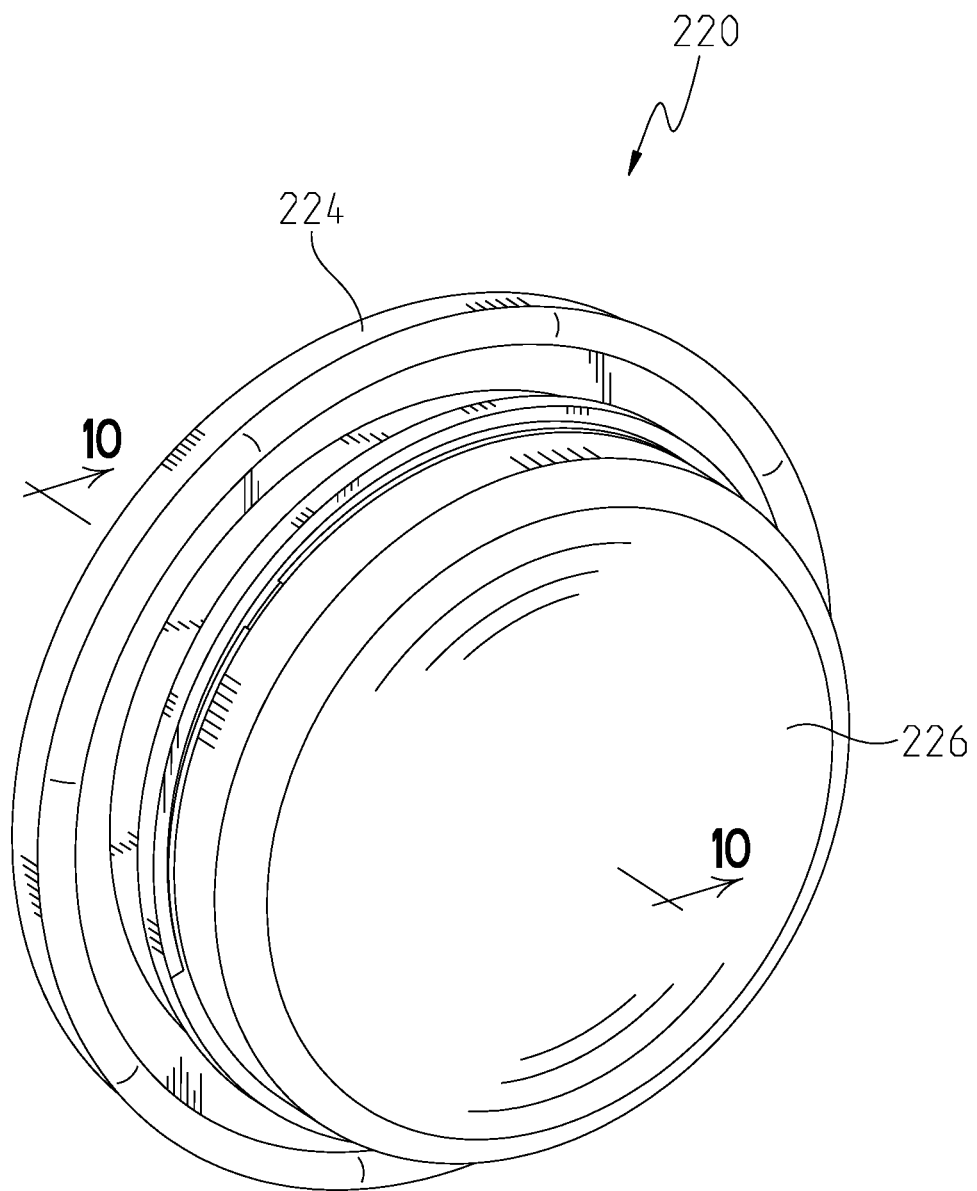
FIG. 6 is a front perspective view of an alternative embodiment pressure compensating apparatus for an electrical housing of the present disclosure.
Figure 7:
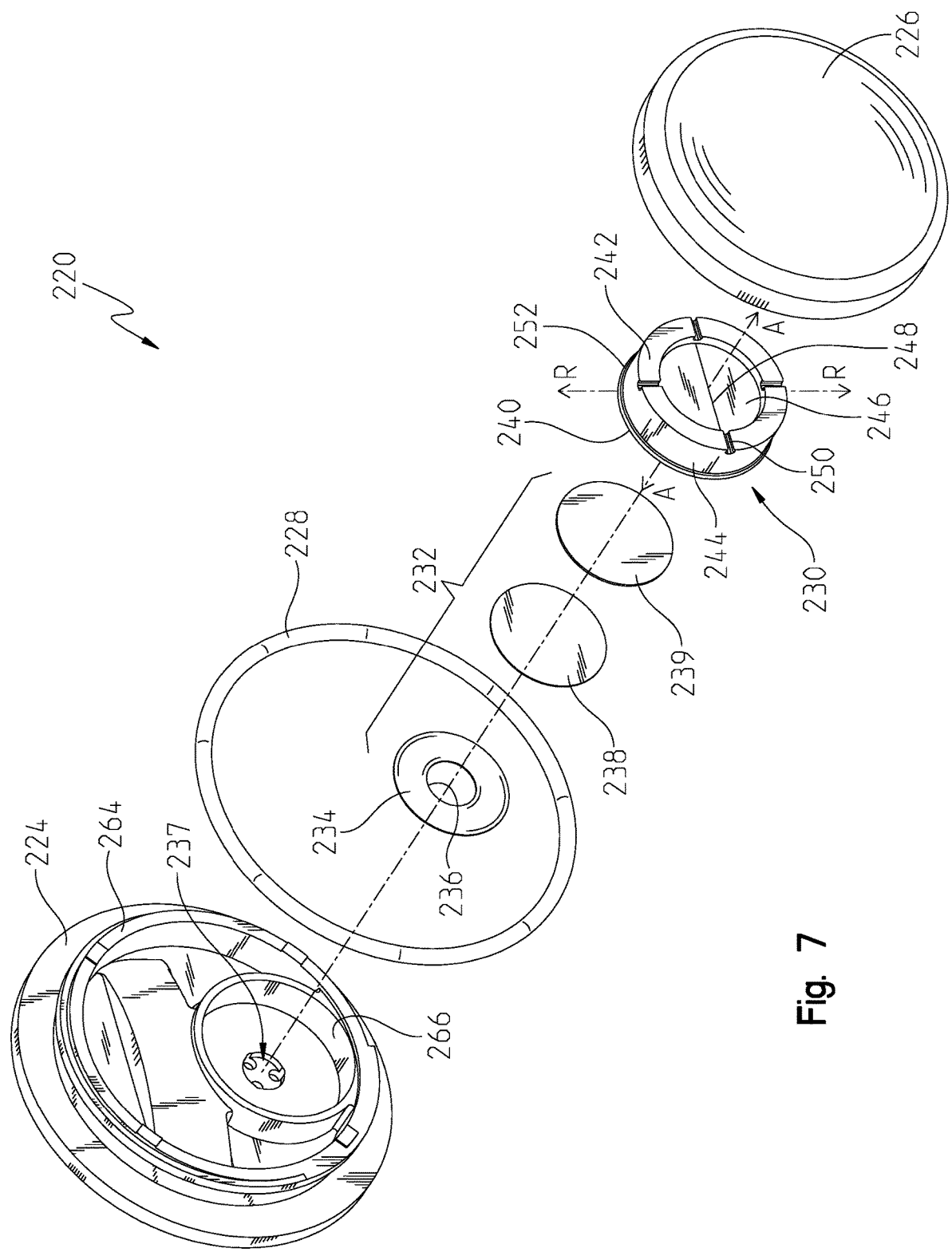
FIG. 7 is an exploded view of the pressure compensating apparatus of FIG. 6.
Figure 8:
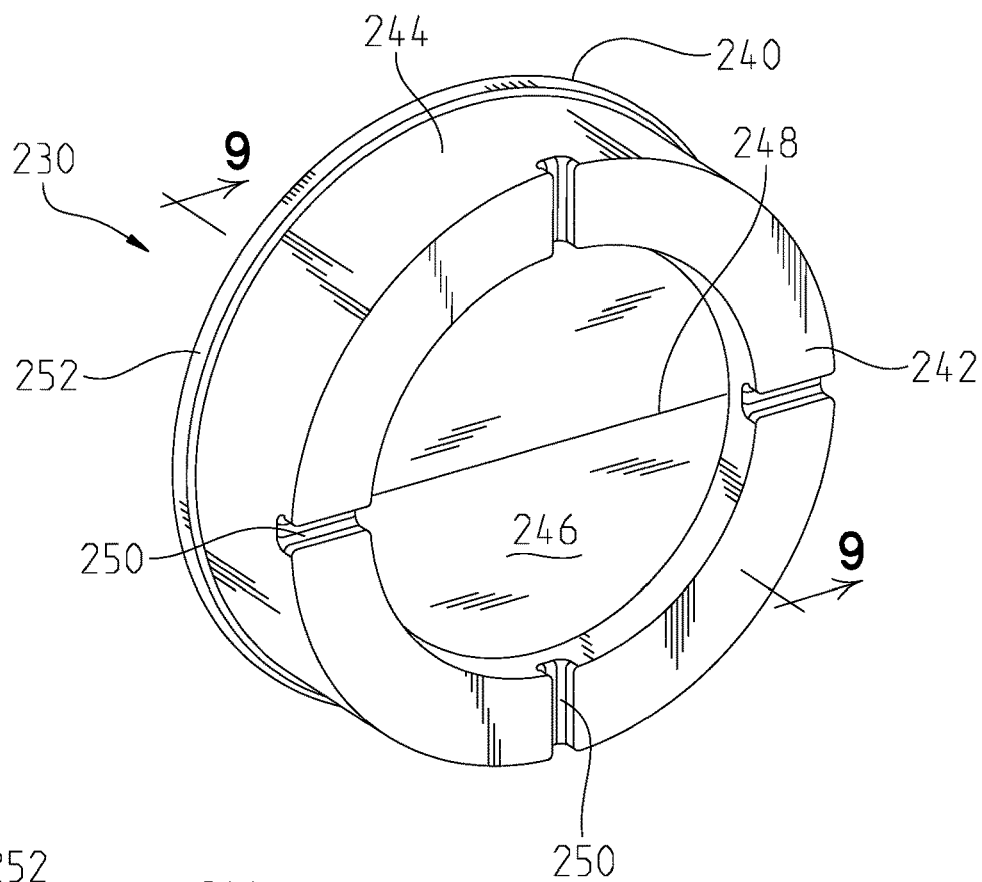
FIG. 8 is a rear perspective view of a seal of the pressure compensating apparatus of FIG. 6.
Figure 9:
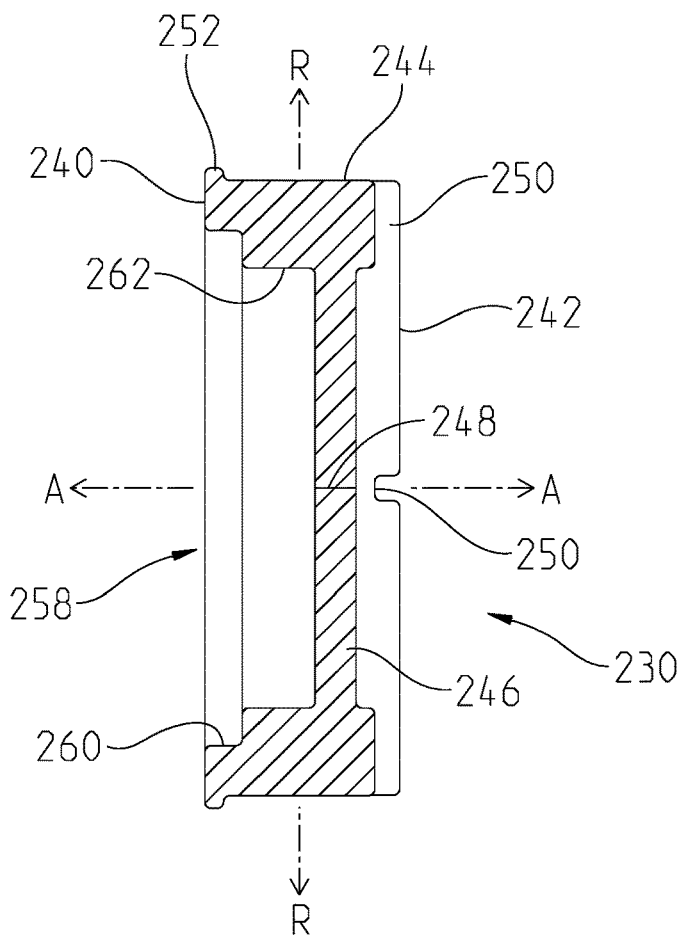
FIG. 9 is a cross-sectional view of the seal of FIG. 8, taken along line 9-9 of FIG. 8.

Referring to FIGS. 6 and 7, pressure compensating apparatus 220 couples with an outer cover 224 of housing 222 and is sealed to one of walls 223 (FIG. 10) of housing 222 with a housing seal 228. Illustratively, housing seal 128 defines an annual seal, however, housing seal 228 may have any shape or configuration necessary to seal outer cover 224 against wall 223.

Outer cover 224 also is configured to support a flexible septum or seal 230 and a hydrophobic filter 232. Seal 230 may be comprised of a polymeric material, for example a non-self-healing material, for example a rubber material, such as natural rubber, as disclosed further herein. Hydrophobic filter 232 may be comprised of a polymeric or ceramic material, such as polytetrafluoroethylene or a porous ceramic material, and is configured to be positioned adjacent to and axially outward from a counterbore 258 of seal 230. As shown in FIGS. 9-12, counterbore 258 of seal 230 includes a first recessed portion 260 and a second recessed portion 262 positioned axially inward of first recessed portion 260. In one embodiment, first recessed portion 260 has a greater diameter than that of second recessed portion 262. Hydrophobic filter 232 may be configured to be positioned within first and/or second recessed portions 260, 262 or may be configured to be positioned axially outward of counterbore 258 and along a portion of seal 230. In one embodiment, adhesive may be applied to the inner and/or outer surfaces of filter 232 to couple filter 232 to portions of seal 230 and/or outer cover 224. Alternatively, in further embodiments, hydrophobic filter 232 may be positioned within a third recessed portion or counterbore 263 positioned adjacent axially inner surface 242 of seal 230.

Illustratively, hydrophobic filter 232 may include a plurality of layers or components coupled together intermediate seal 230 and outer cover 224, which, collectively, define filter 232, however, in other embodiments, hydrophobic filter 232 does not include a plurality of a layers and, instead, defines a single-layer component. In one embodiment, an outer layer 234 of hydrophobic filter 232 includes a vent opening 236, an intermediate layer 238 of hydrophobic filter 232 is positioned inward from outer layer 234, and an inner layer 239 is positioned inwardly of intermediate layer 238. Vent opening 236 of outer layer 234 of hydrophobic filter 232 is configured to align with a vent opening 237 in outer cover 224. In operation, hydrophobic filter 232 prevents fluid and dust from flowing inwardly and entering housing 222 but may be configured to allow air or vapor to flow outwardly from housing 222, thereby preventing moisture or fluid accumulation within housing 222.

Referring to FIGS. 7-10, seal 230 includes an axially outer surface 240 configured to face outwardly from housing 222 and an axially inner surface 242 configured to face inwardly toward housing 222. Axially inner surface 242 is spaced apart from axially outer surface 240 in an axial direction A of seal 230. More particularly, axially inner surface 242 is axially spaced apart from axially outer surface 240 by a circumferentially-extending wall 244 positioned radially outward from axial direction A. Wall 244 defines a circumference of seal 230 and, illustratively, defines a constant outer diameter of seal 230. As such, wall 244 does not includes any annual grooves, recesses, indentations, or protrusions extending in a radial direction R of seal 230 that would define a diameter that is smaller or greater than that of wall 244.

Referring still to FIGS. 7-10, seal 230 further includes a diaphragm 246 positioned axially intermediate axially inner surface 242 and axially outer surface 240. Diaphragm 246 includes a slit or fluid passageway 248 which is configured to open and close based on a pressure differential between the pressure within housing 222 and the pressure exterior of housing 222, as disclosed further herein. By comprising seal 230, including diaphragm 246 of a non-self-healing material, such as rubber material, there is a decreased likelihood that fluid passageway 248 may "seal" itself closed at high temperatures. For example, if diaphragm 246 is comprised of other polymeric materials, such materials may have a tendency to seal together if exposed to elevated temperatures, thereby permanently closing fluid passageway 248 and preventing pressure compensating apparatus 220 from functioning properly. However, by comprising diaphragm 246 of a rubber material, such material is not affected by elevated temperatures to which housing 222 may be exposed and fluid passageway 248 is configured to remain flexible and moveable between the open and closed positions disclosed further herein.

Axially inner surface 242 includes at least one and, illustratively, four, channels 250 which are configured to allow any fluid within housing 222 to flow outwardly therefrom, as disclosed further herein. Additionally, channels 250 prevent battery 226 from experiencing additional pressure from air within housing 222 by allowing air to flow toward seal 230 rather than accumulate at battery 226.

Referring still to FIGS. 7-10, axially outer surface 240 does not include any grooves or recesses because any fluid within housing 222 is configured to flow through vent opening 237 in outer cover 224. However, axially outer surface 240 does include a retention member 252 extending radially outward therefrom, illustratively, a radially-extending rib. More particularly, retention member 252 is flush with, and may be integrally formed with, axially outer surface 240 such that retention member 252 extends directly outward in radial direction R from axially outer surface 240 and is not offset from axially outer surface 240. Retention member 252 is configured to be retained against a portion of outer cover 224 through an interference fit and/or extends into a groove (not shown) in outer cover 224 to retain seal 230 on outer cover 224. In a further embodiment, retention member 252 may not be flush with axially outer surface 240 and may be axially offset therefrom but also axially offset from diaphragm 246 to prevent radial compression of diaphragm 246. In this way, in such an alternative embodiment, retention member 252 may be positioned radially outward from wall 244 at an axial positioned intermediate axially outer surface 240 and diaphragm 246.

Figure 10:
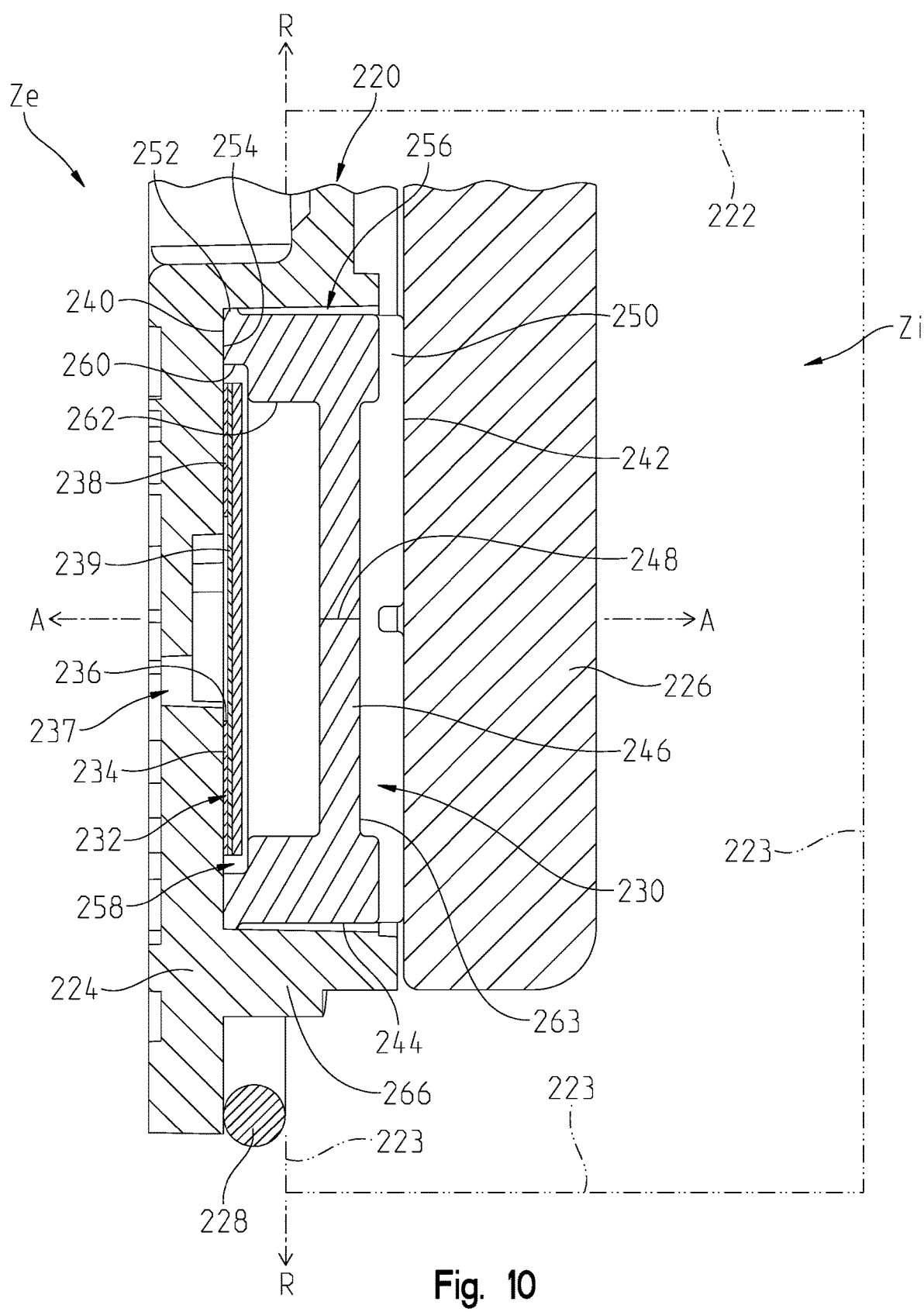
FIG. 10 is a cross-sectional view of the pressure compensating apparatus of FIG. 6 coupled to a meter housing and positioned adjacent an meter or electrical component supported within the housing, taken along line 10-10 of FIG. 6.

As shown in FIG. 10, when retention member 252 couples seal 230 to outer cover 224, axially outer surface 240 contacts an interface 254 of outer cover 224 to define a seal at axially outer surface 240 and interface 254 of outer cover 224. In this way, seal 230 is sealed to outer cover 224 at axially outer surface 240 rather than sealing to outer cover 224 along wall 244 or at axially inner surface 242. Furthermore, because wall 244 of seal 230 is spaced apart from outer cover 224 by a gap 256, no portion of wall 244 of seal 230 forms a seal with outer cover 224. As such, by forming a seal at axially outer surface 240, pressure compensating apparatus 220 of FIGS. 6-12 differs from pressure compensating apparatus 20 of FIGS. 1-5, which forms a seal at rib 54 positioned along the axial length of seal 32 rather than at an axially outer surface of seal 32.

By configuring pressure compensating apparatus 220 to form a seal between interface 254 of outer cover 224 and axially outer surface 240 of seal 230, pressure compensating apparatus 220 of FIGS. 6-12 is easily assembled with housing 222. For example, any pressure or compressive force applied to seal 230 when assembling with outer cover 224 is applied at axially outer surface 240 and retention member 252 because those are the two areas of seal 230 which are in contact with outer cover 224. As such, axially inner surface 242, wall 244, and diaphragm 246 are not in contact with outer cover 224 and, therefore, no assembly force or pressure is applied thereto. Because no compressive force or pressure is applied to diaphragm 246 or the portions of seal 230 generally adjacent diaphragm 246, there is no hindrance to opening and closing fluid passageway 248, as disclosed further herein.

Additionally, the configuration of pressure compensating apparatus 220 allows seal 230 to be assembled with outer cover 224 with greater tolerances. More particularly, because only axially outer surface 240 and retention member 252 contact outer cover 224, the size tolerances for other portions of seal 230, such as wall 244 and axially inner surface 242, do not need to be strictly adhered to given that those surfaces are not intended to contact outer cover 224. As such, minor deviations in the size or configuration of seal 230 and outer cover 224 may be easily accommodated during assembly of seal 230 with outer cover 224.

Referring to FIGS. 7 and 10, during assembly of pressure compensating apparatus 220 with housing 222, an electrical component, for example battery 226 for the meter (FIGS. 7 and 10) may be positioned within an interior zone Zi of housing 222. With battery 226 positioned in interior zone Zi, pressure compensating apparatus 220 may be coupled to housing 222. More particularly, housing seal 228 may be positioned about an inwardly extending wall 264 of outer cover 224 and hydrophobic filter 232 and seal 230 may be positioned within a seal compartment 266 of outer cover 224 adjacent vent opening 237. Illustratively, filter 232 is received within first recessed portion 260 of counterbore 258 of seal 230. When in compartment 266, axially outer surface 240 is in contact with interface 254 of outer cover 224 and retention member 252 is coupled with a portion of compartment 266 through an interference fit to retain seal 230 within compartment 266. To further retain seal 230 within compartment 266 in a manner that forms a seal at axially outer surface 240 and interface 254, battery 226 is in contact with axially inner surface 242. In this way, battery 226 applies an axial force on seal 230 which moves axially outer surface 240 into sealing engagement with interface 254 of outer cover 224. Additionally, by positioning battery 226 in contact with axially inner surface 242, battery 226 may act as a limit stop to prevent diaphragm 246 from opening inwardly which could allow air and moisture outside of housing 222 to enter housing 222.

Figure 12:
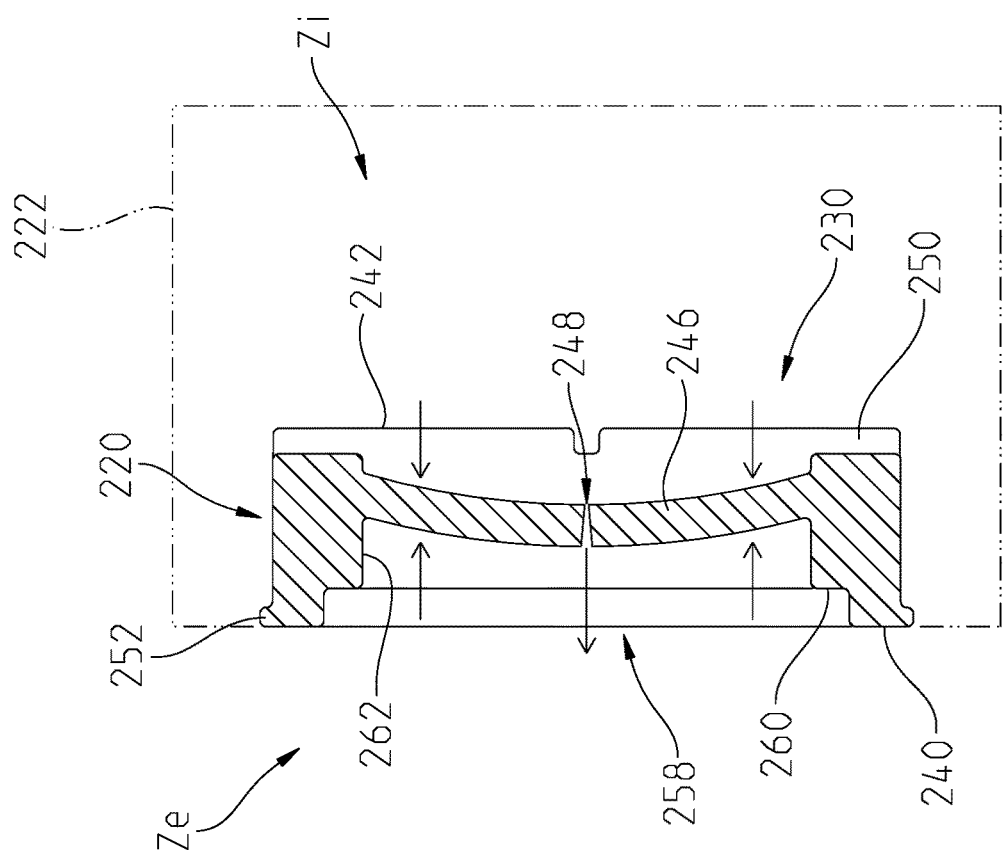
FIG. 12 is a cross-sectional view of the seal of FIG. 9 with the fluid passage in an open position.

Once pressure compensating apparatus 220 is assembled, pressure compensating apparatus 220 operates as disclosed herein with respect to pressure compensating apparatus 20 (FIG. 1). More particularly, because hydrophobic filter 232 may allow a small amount of air and vapor to naturally flow inwardly toward housing 222 at various times, diaphragm 246 is configured to remain in a closed position (FIG. 11) to prevent such air and vapor from flowing into interior zone Zi of housing 222. For example, if the pressure differential causing the air to flow through filter 232 is less than a pressure threshold (e.g., approximately 1.0 psi) of diaphragm 246, diaphragm 246 and fluid passageway 248 remain closed. However, if a pressure difference between interior zone Zi of housing 222 and an exterior zone Ze defined outside of housing 122 (e.g., ambient atmosphere)

exceeds the pressure threshold of diaphragm 246, diaphragm 246 is configured to flex or bow outwardly towards axially outer surface 240 to an open position, as shown in FIG. 12, from its closed position (FIG. 11) which is maintained when the pressure differential between interior and exterior zones Zi, Ze is less than the pressure threshold of diaphragm 246. A drop in pressure at exterior zone Ze indicates that pressure within interior zone Zi is greater than the pressure at exterior zone Ze. As such, because the pressure in interior zone Zi is greater than that at exterior zone Zi, this pressure differential causes diaphragm 246 to bow outwardly and move to the open position (FIG. 12), thereby causing a change in pressure in interior zone Zi of housing 222 by reducing the pressure in interior zone Zi until any pressures pressure differential between interior and exterior zones Zi, Ze is less than or equal to the pressure threshold of diaphragm 246. When the pressure differential between interior and exterior zones Zi, Ze is less than or equal to the pressure threshold of diaphragm 246, diaphragm 246 may automatically move to its closed position (FIG. 11).

More particularly, when the pressure differential between interior and exterior zones Zi, Ze exceeds the pressure threshold diaphragm 246, for example approximately 1.0 psi, diaphragm 246 moves to the open position by an amount sufficient to cause fluid passageway 248 to open, as shown in FIG. 12. In one example, the pressure differential may exceed the threshold during air transportation or other significant changes in altitude or ambient temperature. It may be appreciated that, during the brief time that fluid passageway 248 is open, air or fluid flows from interior zone Zi to exterior zone Ze. The air or vapor within interior zone Zi flows toward and around battery 226 and is able to flow toward fluid passageway 248 of diaphragm 246 by flowing through channels 250 at axially inner surface 242. The air or vapor then flows through fluid passageway 248, through filter 232, and out of housing 222 through vent opening 237 because vent opening 237 is in fluid communication with fluid passageway 248 to allow air transport between interior and exterior zones Zi, Ze. It may be apparent that any air or vapor that flows around battery 226 and into gap 256 between wall 244 of seal 230 and outer cover 224 cannot bypass fluid passageway 248 because axially outer surface 240 is sealed to outer cover 224 at interface 254, thereby preventing air or vapor within housing 222 from bypassing fluid passageway 248 and also preventing air or fluid from exterior zone Ze from entering housing 222. Additionally, filter 232 is configured to prevent dust or water from exterior zone Ze from flowing inwardly toward housing 222. In this way, the axial sealing at axially outer surface 240 of seal 230 and hydrophobic filter 232 are configured to seal housing 222 from fluid that may damage battery 226 or other electrical components therein. Additionally, housing seal 228 ensures that outer cover 224 is sealed against housing 222, which further inhibits fluid from entering housing 222.

Figure 13:
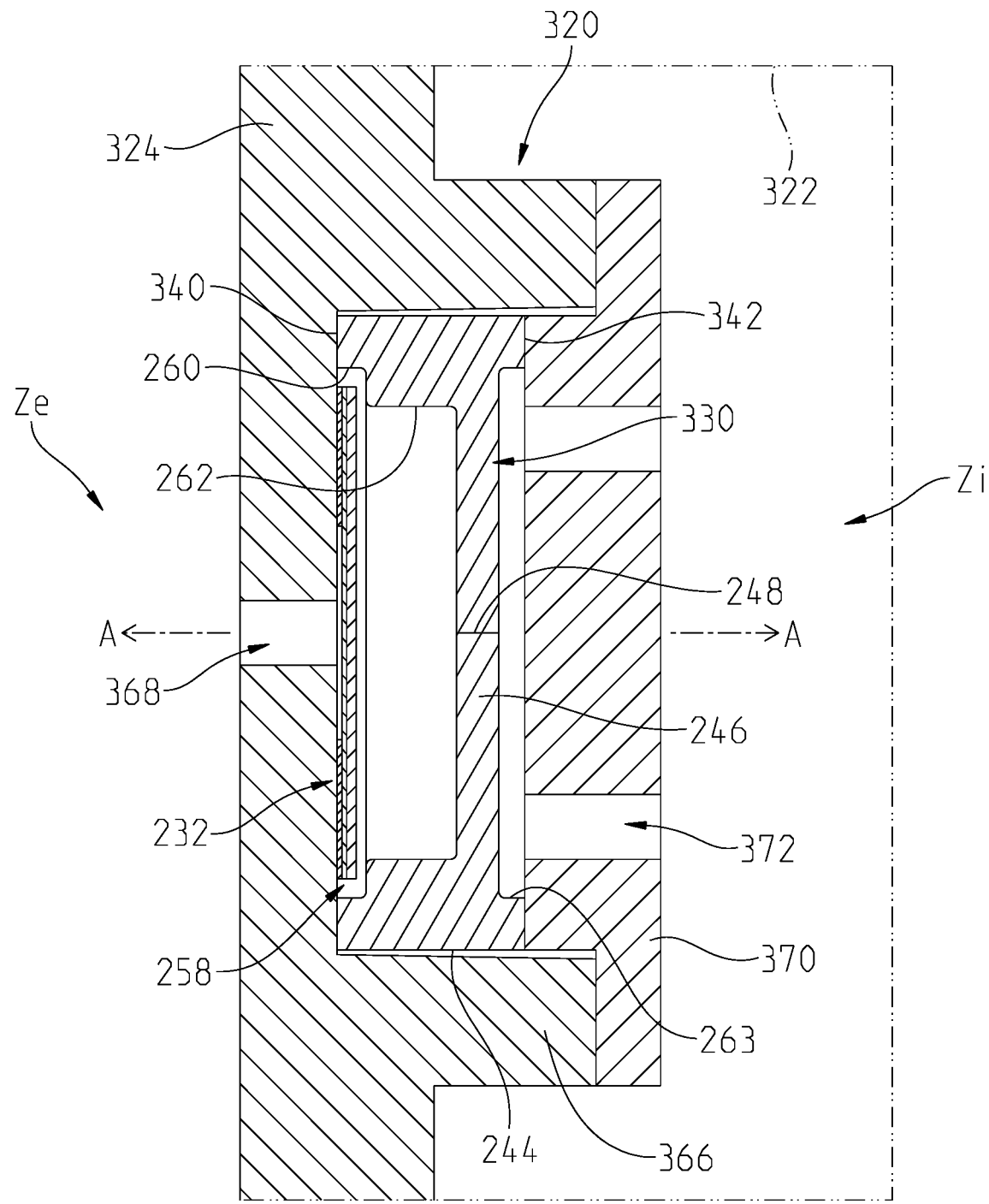
FIG. 13 is a cross-sectional view of an alternative pressure compensating apparatus and electrical housing of the present disclosure.

Referring to FIGS. 13-16, various alternative embodiments of pressure compensating apparatus 220 and housing 222 (FIG. 10) are disclosed. With respect to FIG. 13, an alternative pressure compensating apparatus 320 is coupled to a meter housing 322. Housing 322 includes an outer wall 324 having a vent opening 368 which extends in axial direction A. Outer wall 324 is configured to engage with a seal 330 by sealingly contacting an axially outer surface 340 of seal 330. Additionally, an axially inner surface 342 of seal 330 may be sealingly coupled to an inner cover 370 for housing 322. More particularly, as shown in FIG. 13, inner cover 370 is configured to contact axially inner surface 342 of seal 330 and a portion of housing 322 such that inner cover 370 may be sealed against seal 330 and housing 322. In this way, seal 330 may be sealed to housing 322 at axially outer surface 340 and/or axially inner surface 342 to inhibit water, dust, and debris from entering interior zone Zi of housing 322.

Figure 11:
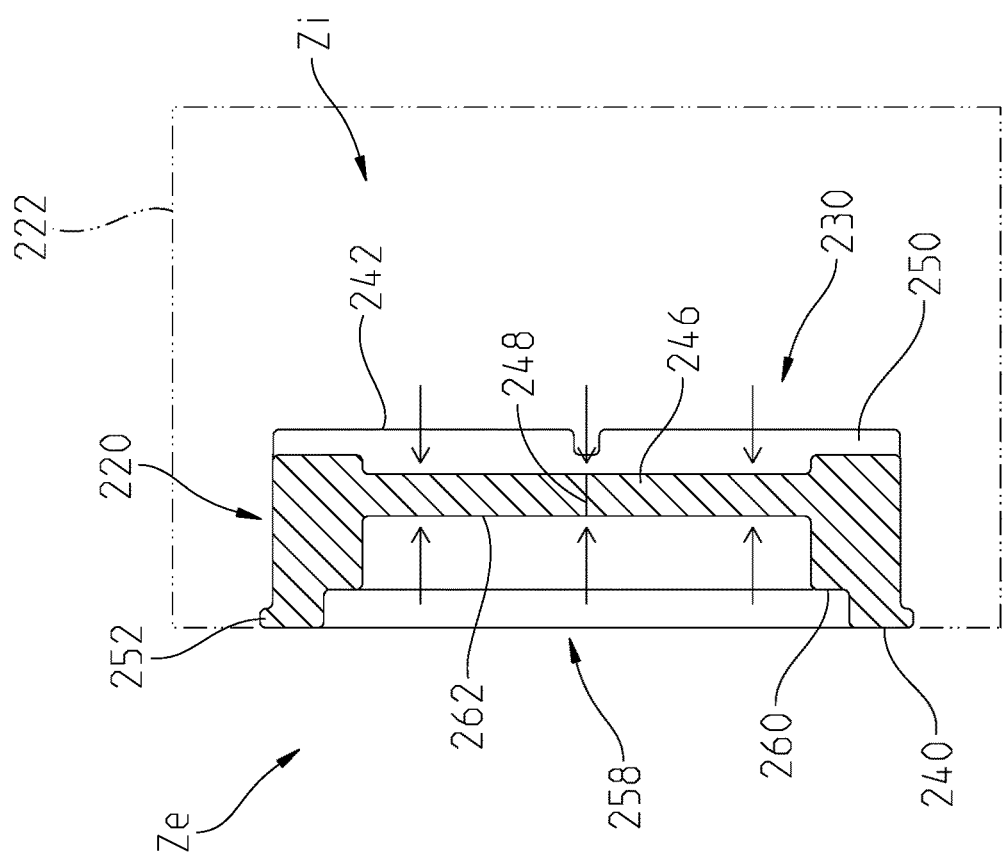
FIG. 11 is a cross-sectional view of the seal of FIG. 9 with a fluid passage in a closed position.

Referring still to FIG. 13, inner cover 370 of housing 322 may include fluid passages 372 which allow any vapor or air within interior zone Zi of housing 322 to flow outwardly in axial direction A, through fluid passageway 248 of diaphragm 246 of seal 330, through recessed portions 258, 260 and filter 232, and through vent opening 368 if the pressure at interior zone Zi is sufficiently greater than that of exterior zone Ze, as is disclosed herein with respect to FIGS. 10-12. Illustratively, filter 232 is positioned within first recessed portion 258 of seal 330 and is axially outward from diaphragm 246 such that any fluid flowing into housing 322 is filtered before contacting diaphragm 246.

Seal 330 may be retained on housing 322 through an interference fit. Illustratively, seal 330 does not include any retention members such that circumferentially-extending wall 244 has a continuous outer diameter at axially outer surface 340, axially inner surface 342, and at all axial locations therebetween. As such, seal 330 may be frictionally retained within a seal compartment 366 of outer wall 324 of housing 322 and may be in sealing contact with outer wall 324 and inner cover 370.

As shown in FIG. 13, diaphragm 246 is positioned adjacent inner cover 370 and closer to interior zone Zi than exterior zone Ze. As such, diaphragm 246 is configured to move outwardly towards exterior zone Ze to expel air or vapor from interior zone Zi but is inhibited from moving inwardly towards interior zone Zi by inner cover 370 which inhibits air or vapor from entering interior zone Zi. In this way, the position of diaphragm 246 relative to inner cover 370 allows diaphragm 246 to function as a one-way valve by facilitating movement of air and vapor outwardly from interior zone Zi and inhibiting movement of air and vapor inwardly toward interior zone Zi.

Figure 14:
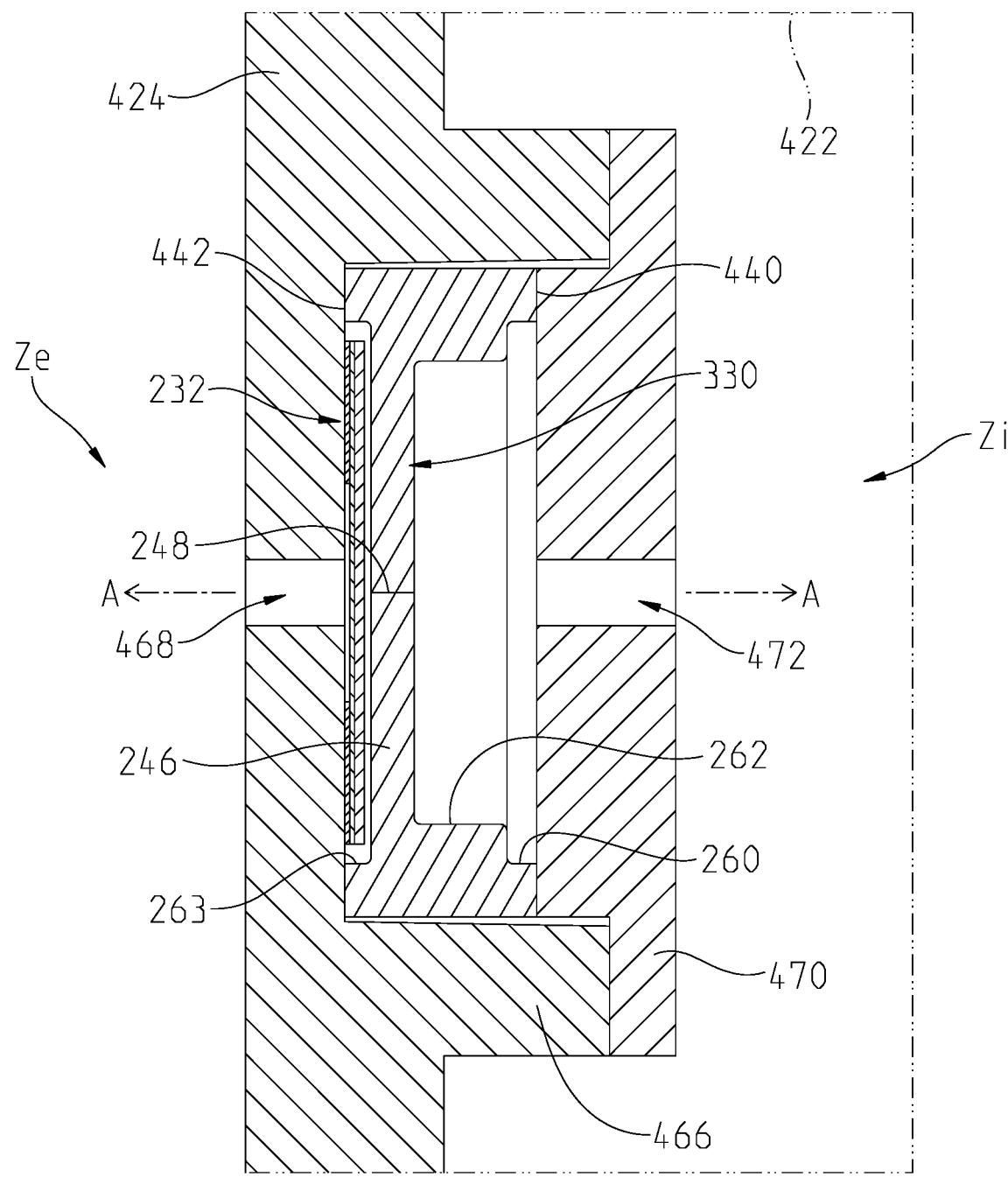
FIG. 14 is a cross-sectional view of another alternative pressure compensating apparatus and electrical housing of the present disclosure.

With respect to FIG. 14, another alternative pressure compensating apparatus 420 is coupled to a meter housing 422. Housing 422 includes an outer wall 424 having at least one vent opening 468 which extends in axial direction A. Outer wall 424 is configured to engage with seal 330, which is identical to seal 330 of FIG. 13 but is oriented in an opposite configuration on housing 422 than on housing 322 (FIG. 13). For example, outer wall 424 of housing 422 is configured to engage seal 330 by sealingly contacting an axially outer surface 442 of seal 330. Additionally, an axially inner surface 440 of seal 330 may be sealingly coupled to an inner cover 470 for housing 422. More particularly, as shown in FIG. 14, inner cover 470 is configured to contact axially inner surface 440 of seal 330 and a portion of housing 422 such that inner cover 470 may be sealed against seal 330 and housing 422. In this way, seal 330 may be sealed to housing 422 at axially outer surface 442 and/or axially inner surface 440 to inhibit water, dust, and debris from entering interior zone Zi of housing 422.

Referring still to FIG. 14, inner cover 470 of housing 422 may include at least one fluid passage 472, which allows any vapor or air to flow between exterior zone Ze and interior zone Zi of housing 422 in axial direction A if the pressure at exterior zone Ze is sufficiently greater than that of interior zone Zi in the same manner generally disclosed herein with respect to FIGS. 10-12. Illustratively, filter 232 is positioned within third recessed portion 263 of seal 330 and is axially outward from diaphragm 246.

As shown in FIG. 14, diaphragm 246 is positioned adjacent outer wall 424 and closer to exterior zone Ze than interior zone Zi. As such, diaphragm 246 is configured to move inwardly towards interior zone Zi to allow air or vapor from exterior zone Ze to flow into housing 422 but is inhibited from moving outwardly towards exterior zone Ze by hydrophobic filter 232 which inhibits air or vapor from flowing outwardly from interior zone Zi. In this way, the position of diaphragm 246 relative to outer wall 424 allows diaphragm 246 to function as a one-way valve by facilitating movement of air and vapor inwardly from exterior zone Ze and inhibiting movement of air and vapor outwardly from interior zone Zi. As such, if the pressure in interior zone Zi is substantially greater than the pressure at exterior zone Ze, hydrophobic vent 232, which may be adhered to outer wall 424 of housing 422, acts as a mechanical stop and inhibits diaphragm 246 from opening in an outward direction. Therefore, housing 422 may remain sealed and pressure is not released from housing 422.

Figure 15:
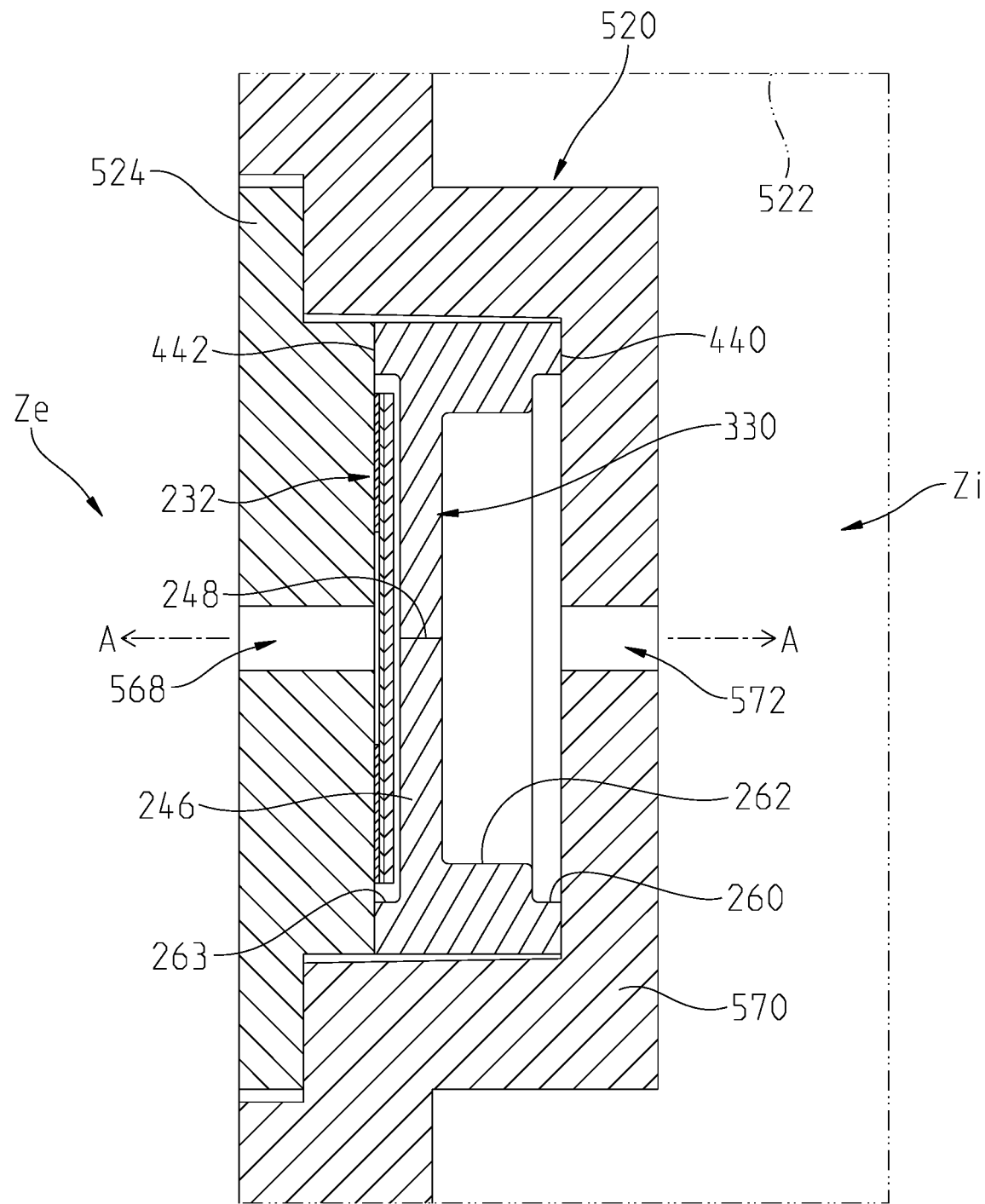
FIG. 15 is a cross-sectional view of a further alternative pressure compensating apparatus and electrical housing of the present disclosure.

With respect to FIG. 15, another alternative pressure compensating apparatus 520 is coupled to a meter housing 522. Housing 522 includes an outer cover 524 having at least one vent openings 568 which extends in axial direction A. Outer cover 524 and inner compartment 570 are configured to engage with seal 330, which is identical to seal 330 of FIG. 14. For example, inner compartment 570 is configured to engage seal 330 by sealingly contacting axially inner surface 440. Alternatively, outer cover 524 of housing 522 may be configured to engage seal 330 by sealingly contacting axially outer surface 442 of seal 330. In this way, seal 330 may be sealed to housing 522 at axially outer surface 442 and/or axially inner surface 440 to inhibit water, dust, and debris from entering interior zone Zi of housing 522.

Referring still to FIG. 15, inner cover 570 of housing 422 may include at least one fluid passage 572, which allows any vapor or air to flow between exterior zone Ze and interior zone Zi of housing 522 in axial direction A if the pressure at exterior zone Ze is sufficiently greater than that of interior zone Zi in the same manner generally disclosed herein with respect to FIGS. 10-12. Illustratively, filter 232 is positioned within third recessed portion 263 of seal 330 and is axially outward from diaphragm 246.

As shown in FIG. 15, diaphragm 246 is positioned adjacent outer cover 524 and closer to exterior zone Ze than interior zone Zi. As such, diaphragm 246 is configured to move inwardly towards interior zone Zi to allow air or vapor from exterior zone Ze to flow into housing 522 but is inhibited from moving outwardly towards exterior zone Ze by hydrophobic filter 232 which inhibits air or vapor from flowing outwardly from interior zone Zi. In this way, the position of diaphragm 246 relative to outer cover 524 allows diaphragm 246 to function as a one-way valve by facilitating movement of air and vapor inwardly from exterior zone Ze and inhibiting movement of air and vapor outwardly from interior zone Zi. As such, if the pressure in interior zone Zi is substantially greater than the pressure at exterior zone Ze, hydrophobic vent 232, which may be adhered to outer cover 524 of housing 522, acts as a mechanical stop and inhibits diaphragm 246 from opening in an outward direction. Therefore, housing 522 may remain sealed and pressure is not released from housing 522.

Figure 16:
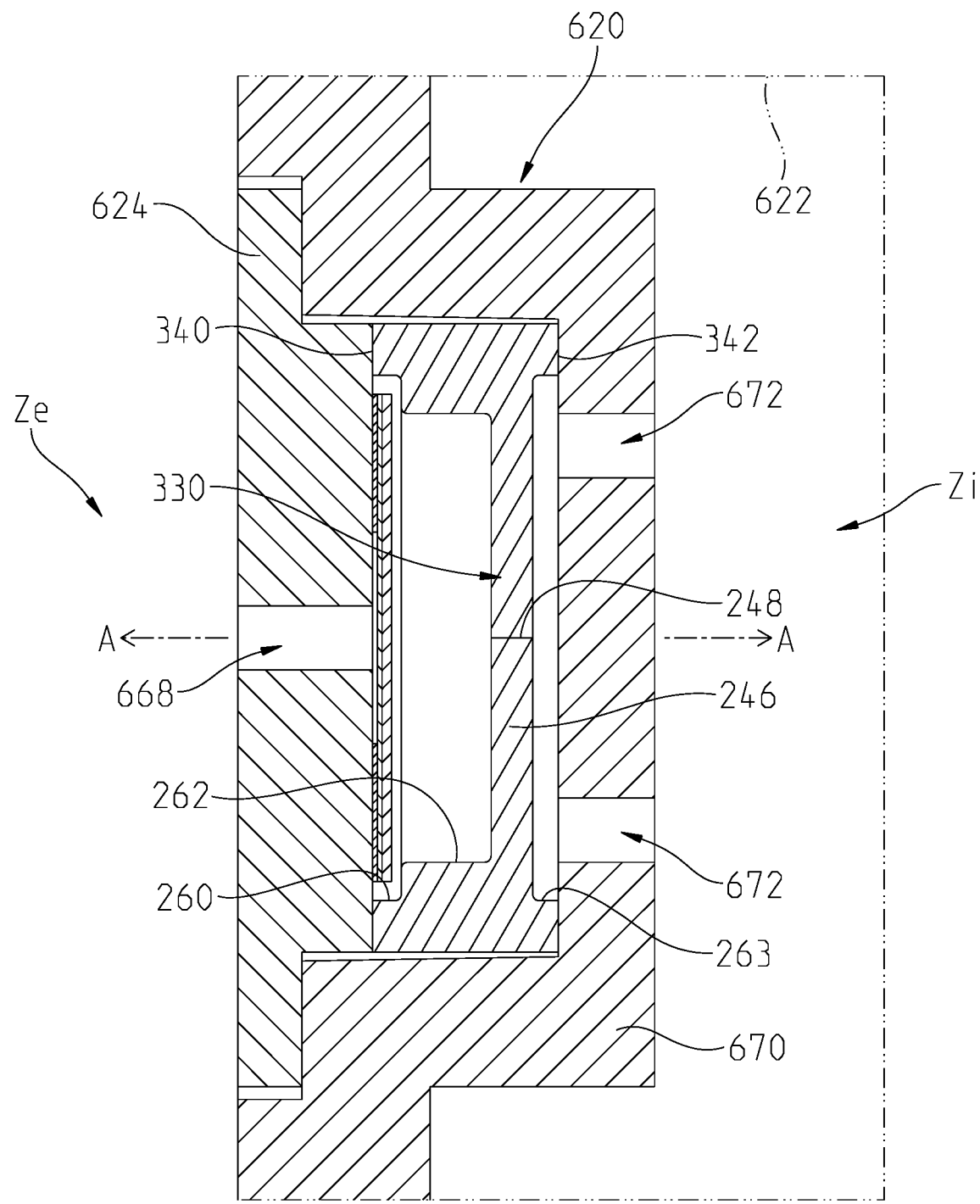
FIG. 16 is a cross-sectional view of another alternative pressure compensating apparatus and electrical housing of the present disclosure.

With respect to FIG. 16, a further alternative pressure compensating apparatus 620 is coupled to a meter housing 622. Housing 622 includes an outer cover 624 having at least one vent opening 668 which extends in axial direction A. Outer cover 624 and inner compartment 670 are configured to engage with seal 330, which is identical to seal 330 of FIG. 13. For example, inner compartment 670 is configured to engage seal 330 by sealingly contacting axially inner surface 642. Alternatively, outer cover 624 of housing 622 may be configured to engage seal 330 by sealingly contacting axially outer surface 340 of seal 330. In this way, seal 330 may be sealed to housing 622 at axially outer surface 340 and/or axially inner surface 342 to inhibit water, dust, and debris from entering interior zone Zi of housing 622.

Referring still to FIG. 16, inner compartment 670 of housing 622 may include at least one fluid passage 672 which allows any vapor or air within interior zone Zi of housing 622 to flow outwardly in axial direction A, through third recessed portion 263 of seal 330, through fluid passageway 248 of diaphragm 246 of seal 330 and filter 232, and through vent opening 668 if the pressure at interior zone Zi is sufficiently greater than that of exterior zone Ze, as is disclosed herein with respect to FIGS. 10-12. Illustratively, filter 232 is positioned within first recessed portion 260 of seal 330 and is axially outward from diaphragm 246 such that any fluid flowing into housing 522 is filtered before contact diaphragm 246.

As shown in FIG. 16, diaphragm 246 is positioned adjacent inner compartment 670 and closer to interior zone Zi than exterior zone Ze. As such, diaphragm 246 is configured to move outwardly towards exterior zone Ze to expel air or vapor from interior zone Zi but is inhibited from moving inwardly towards interior zone Zi by inner compartment 670 which inhibits air or vapor from entering interior zone Zi. In this way, the position of diaphragm 246 relative to inner compartment 670 allows diaphragm 246 to function as a one-way valve by facilitating movement of air and vapor outwardly from interior zone Zi and inhibiting movement of air and vapor inwardly toward interior zone Zi.

With respect to FIGS. 13-16, as with the embodiment of FIGS. 6-12, diaphragm 246 and fluid passageway 248 are not axially compressed because a force is applied to seal 330, 430 in axial direction A, rather than radial direction R (FIG. 10). As such, the meter housing is axially sealed against the axially inner and/or outer surfaces of seal 330, 430, rather than at any type of radial protrusion along wall 244 of seals 330, 430, as disclosed in the embodiment of FIGS. 1-5. The axial force applied to seals 330, 430 may be produced by a portion of the meter housing, such as the inner covers, outer covers, and/or inner compartments of the meter housing.

While the foregoing description was made in the context of preferred embodiments, it is contemplated that modifications to those embodiments may be made without departure from the invention as claimed. For instance, the seal and the shape defined by the annulus need not be circular. An elliptical or other shape will suffice. Similarly, the rib described in the first preferred embodiment may be configured so that compression provided by it is limited to the direction for closing the slit. Moreover, it is contemplated that without undo experimentation, the size of the slit, and the diaphragm size and thickness can be selected or "tuned" for optimal pressure compensation for any given application of compartment volume size, anticipated pressure, the expected environment where the apparatus is used, as well as the fragility of the housing or robustness of the housing water seals.

What is claimed is:

1. A seal for a meter housing having an interior portion, the seal comprising:
   an axially inner surface configured to face the interior portion of the meter housing;

an axially outer surface configured to face away from the interior portion of the meter housing, and at least one of the axially outer surface and the axially inner surface is configured to seal against a portion of the meter housing; and a diaphragm defined axially intermediate the axially inner surface and the axially outer surface, the diaphragm being configured to move between an open position and a closed position in response to a pressure differential between the interior portion of the housing and an exterior portion, wherein a fluid passageway is defined when the diaphragm is in the open position and the fluid passageway is undefined when the diaphragm is in the closed position.

2. The seal of claim 1, wherein the axially outer surface includes a retention member extending radially outward and configured to couple with a portion of the meter housing.

3. The seal of claim 2, wherein the retention member defines a radially-extending rib flush with the axially outer surface.

4. The seal of claim 2, further comprising a circumferentially-extending wall positioned intermediate the axially inner surface and the axially outer surface, and the circumferentially-extending wall defines a constant diameter of the seal.

5. The seal of claim 4, wherein a radial extent of the circumferentially-extending wall is less than a radial extent of the retention member.

6. The seal of claim 1, wherein a portion of the housing is positioned adjacent the diaphragm, and the fluid passageway of the diaphragm is configured to move to the open position in a first direction and is inhibited from moving to the open position in a second direction by the portion of the housing.

7. The seal of claim 1, wherein the axially outer surface includes a recessed portion configured to receive a hydrophobic filter for the meter housing and the diaphragm is positioned adjacent the recessed portion.

8. The seal of claim 1, wherein the seal is comprised of a non-self-healing material.

9. A meter housing, comprising:
a plurality of walls generally enclosing an interior portion of the housing;
a recessed area generally adjacent at least one of the plurality of walls; and
a seal positioned at one of the plurality of walls and comprising:
an axially inner surface facing the interior portion of the housing;
an axially outer surface facing away from the interior portion of the housing, and at least one of the axially inner surface and the axially outer surface is configured to seal against a portion of the meter housing to sealingly enclose the interior portion of the housing, and the axially outer surface is positioned within the recessed area; and
a diaphragm defined intermediate the axially inner surface and the axially outer surface, the diaphragm having a fluid passage configured to open in response to a pressure differential between a pressure in the interior portion of the housing and a pressure exterior of the housing.

10. The housing of claim 9, wherein the portion of the housing includes a vent opening in fluid communication with the fluid passage of the diaphragm and is configured for fluid to flow in at least one of an inward direction and an outward direction.

11. The housing of claim 9, further comprising a hydrophobic filter configured to be received within a recessed portion of the seal.

12. The housing of claim 11, wherein the recessed portion of the seal includes a first recessed portion configured to receive the hydrophobic filter and a second recessed portion positioned axially inward from the first recessed portion, and the diaphragm is positioned adjacent the second recessed portion.

13. The housing of claim 12, wherein the second recessed portion of the seal has a smaller diameter than a diameter of the first recessed portion.

14. The housing of claim 9, wherein the seal further comprises a circumferentially-extending wall positioned intermediate the axially inner surface and the axially outer surface, and the circumferentially-extending wall defines a constant diameter of the seal.

15. The housing of claim 9, wherein the seal further comprises a retention member extending radially outward from the axially outer surface.

16. The housing of 15, wherein the retention member is positioned within the recessed area.

17. A meter housing, comprising:
a plurality of walls generally enclosing an interior portion of the housing;
an outer cover configured to be positioned adjacent an opening in one of the plurality of walls;
an electrical component supported within the interior portion of the housing; and
a seal positioned at the opening in the one of the plurality of walls and comprising:
an axially inner surface facing the electrical component supported within the housing;
an axially outer surface facing the outer cover of the housing, and at least one of the axially inner surface and the axially outer surface is configured to seal against the housing; and
a diaphragm defined intermediate the axially inner surface and the axially outer surface, the diaphragm having a fluid passage configured to open in response to a pressure differential between a pressure in the interior portion of the housing and a pressure exterior of the housing, wherein the electrical component is configured to apply a force to the seal and the force from the electrical component is configured to seal the interior portion of the housing at the axially outer surface of the seal.

18. The housing of claim 17, further comprising at least one fluid channel positioned intermediate the electrical component and the axially inner surface of the seal.

19. The housing of claim 17, wherein the electrical component is a battery.

20. The housing of claim 17, wherein the seal further comprises a retention member extending radially outward from the axially outer surface.

* * * * *